D. E. PARKER.
DEVICE FOR GENERATING AND ADMINISTERING OXYGEN.
APPLICATION FILED JULY 22, 1909.
980,996. Patented Jan. 10, 1911.
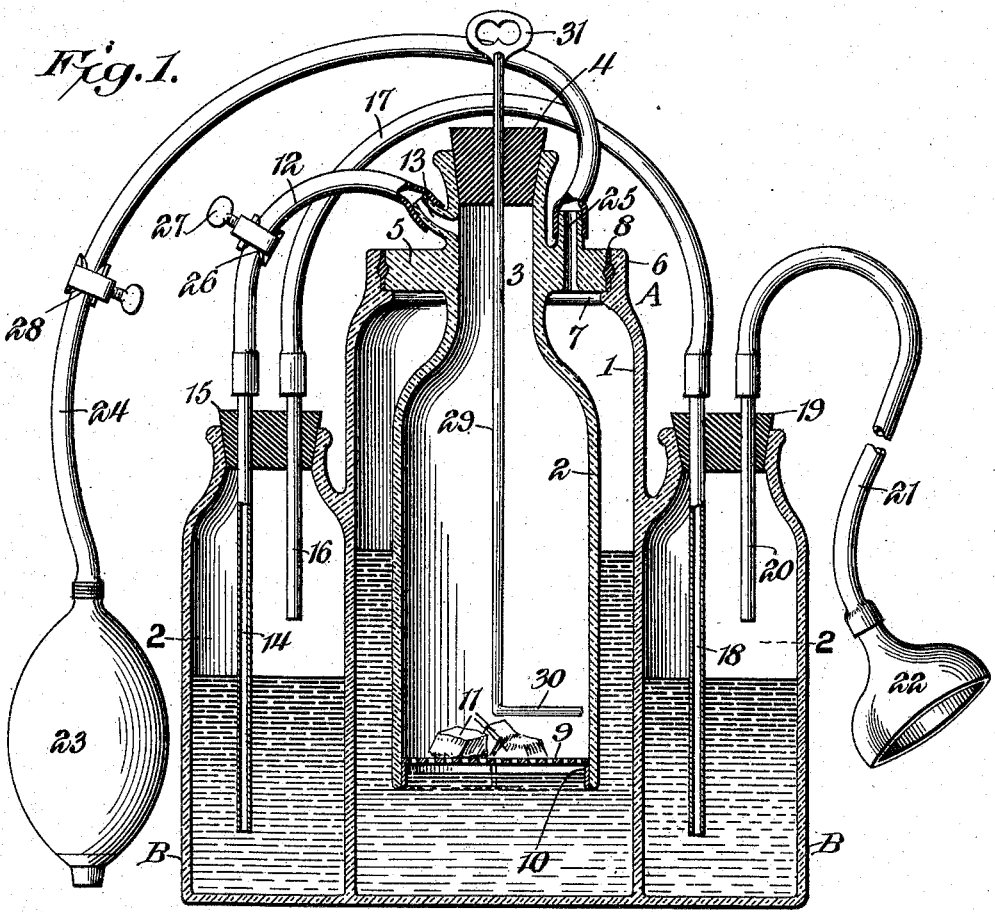
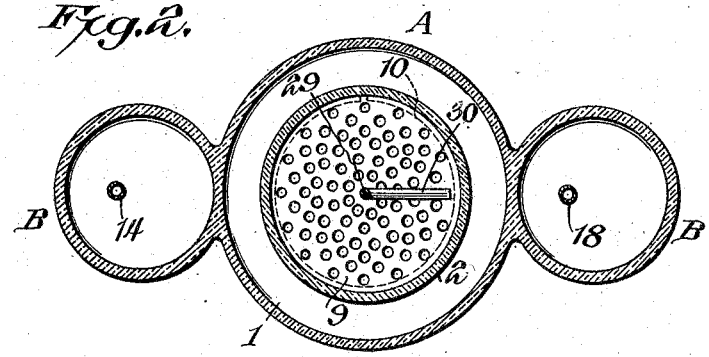
Witnesses
Howard D. Orr.
C. Bradway.
David E. Parker, Inventor,
By E. G. Siggers
Attorney

UNITED STATES PATENT OFFICE.

DAVID E. PARKER, OF NIAGARA FALLS, NEW YORK.

DEVICE FOR GENERATING AND ADMINISTERING OXYGEN.

980,996.   Specification of Letters Patent.   Patented Jan. 10, 1911.

Application filed July 22, 1909. Serial No. 509,025.

*To all whom it may concern:*

Be it known that I, DAVID E. PARKER, a citizen of the United States, residing at Niagara Falls, in the county of Niagara and State of New York, have invented a new and useful Device for Generating and Administering Oxygen, of which the following is a specification.

This invention relates to an inhaler or respirator intended primarily for use by physicians and others to generate oxygen and administer the same to patients in the treatment of certain diseases.

The invention has for one of its objects to provide a device of this character which is of comparatively simple and inexpensive construction, reliable and efficient in use, and so designed as to facilitate the generation and administering oxygen to patients.

Another object of the invention is the provision of an oxygen generator in which oxone briquets are used to generate the oxygen by the action of water thereon, the generator being so designed that the supply of water to the oxone can be adjusted according to the demand for oxygen, so that when no oxygen is required, the supply of water will be automatically cut off to thus prevent waste of the oxone, and while, when oxygen is being administered, the supply of water is automatically maintained to generate the oxygen as needed.

A further object is the employment, in connection with a generator of this character, of one or more washers whereby the impurities are removed from the gas before being administered to the patient.

With these objects in view and others, as will appear as the description proceeds, the invention comprises the various novel features of construction and arrangement of parts which will be more fully described hereinafter and set forth with particularity in the claims appended hereto.

In the accompanying drawing, which illustrates one embodiment of the invention, Figure 1 is a central vertical section of the device. Fig. 2 is a horizontal section on line 2—2, Fig. 1.

Similar reference characters are employed to designate corresponding parts throughout the views.

The apparatus is intended primarily for generating oxygen from a compound known commercially as oxone, which is manufactured from sodium peroxid treated in an electric furnace for eliminating, to a large extent, the impurities inherent in the peroxid such as carbonic acid gas. And after being so treated, the material is molded into briquets for the market. This oxone is readily acted on by water, so that the oxygen is liberated and can be used for medicinal or other purposes. As the oxygen contains impurities of alkaline character, the gas is passed through one or more washers for removing the impurities, and as the action of the water on the oxone is quite rapid, the generator is so designed that only a small quantity of water can feed to the oxone, so that an unnecessary waste of the latter is prevented.

Referring to the drawing, A designates the oxygen generator which, preferably, consists of a tank or reservoir 1 of any approved form such as a jar, in which is contained an oxygen generating chamber 2 in the form of a bell having a neck portion 3 normally closed by a stopper 4, and the neck portion of the bell 2 has an annular flange 5 which forms a closure for the reservoir 1. The reservoir is formed with a contracted neck 6 for receiving the closure 5 which rests on an internal flange 7, and surrounding the closure 5 is a packing 8 for preventing the escape of air or gas. The lower end of the bottle-shaped inner section 2 of the generator is open and is provided with a perforated or foraminous diaphragm 9 which is held in place by a split ring 10 whereby the diaphragm can be raised or lowered, as desired. This diaphragm supports the oxone briquets 11 which are inserted through the neck 3 of the inner section of the generator and are acted on by water which rises through the open bottom of the inner section of the generator and perforations of the diaphragm, the water being contained in the reservoir 1 in which the lower end of the oxygen chamber 2 is submerged. The reservoir 1 is only partially filled so that an air space is provided to permit the pressure of the oxygen within the chamber 2 and pressure of air in the reservoir, to become equalized.

The oxygen is conducted away from the inner chamber 2 through a tube 12 connected with a nipple 13 formed on the neck 3 at a point above the closure 5, and the oxygen is passed through one or more washers so as to remove impurities. In the present instance, two washers B are shown, which are preferably, although not necessarily, formed integral with the reservoir 1. These washers contain water through which the oxygen is passed for eliminating the impurities. The tube 12 is connected with a pipe 14 passing through a stopper 15 in one of the washers and extends downwardly through the water to a point adjacent the bottom, and in the stopper 15 is a shorter pipe 16 which is connected by a hose or other tube 17 with an inlet pipe 18 of the other washer which is carried by the stopper 19 thereof, and the oxygen, after passing through the water in the second washer, finds exit through the outlet pipe 20 in the stopper 19. This pipe is equipped with a flexible hose 21 that carries a mouth piece or cap 22 which can be placed over the patient's mouth and nose so as to inhale the oxygen. The liberation of the oxygen from the oxone creates considerable pressure, so that it readily passes through the washers without much diminution in pressure so that it can be conveniently applied to the patient.

In case it is desired to increase the supply of oxygen, as where it is necessary to resuscitate the patient, a device is provided to increase the pressure of air in the reservoir so that more water will feed to the oxone and hence the generation of oxygen will be accelerated. For this purpose, an air pump in the form of a bulb 23 is provided which is connected by a tube 24 with a nipple 25 formed on the closure 5 of the reservoir. By compressing the bulb 23, the pressure of the air in the reservoir can be increased so as to depress the annular column of water surrounding the chamber 2 and thus cause water to rise in the latter through the perforated diaphragm. This increased supply of water to the oxone will cause a greater amount of oxygen to be liberated so that a larger charge can be given to the patient. The tube 12 is equipped with a device 26 which, by manipulating the screw 27, pinches the tube so as to effectively cut off the flow of oxygen. The tube 24 can be equipped with a similar device 28 for closing the tube. The stopper 4 carries an agitator for loosening the oxone crystals from the diaphragm 9 so that water can always have free access to the oxone through the diaphragm. This agitator is in the form of a rod 29 which passes through the stopper 4 and has its lower end formed into a horizontal arm 30 and its outer end formed into a grip 31. The agitator can be thrust inwardly to engage the diaphragm and then given one or more turns to loosen the crystals.

When the device is not in use, the valve or device 26 is closed so that there will be no waste of oxygen, the valve 26 being closed immediately after the administration of oxygen to the patient. The pressure of the oxygen is retained in the chamber 2 and re-acts on the water so as to force the latter downwardly below the diaphragm and away from the oxone so that the generation of the oxygen will cease. This means that the air pressure in the reservoir and the oxygen in the chamber 2 will be equalized. As soon as the valve 26 is again opened to administer oxygen, the pressure in the chamber 2 will fall so that the water will rise through the diaphragm and act on the oxone so as to liberate oxygen, and as soon as this takes place, the pressure in the chamber 2 increases so as to check the inflow of water and prevent any more than the required amount to act on the oxone. It will thus be seen that the feed of water to the chamber 2 is controlled by the variation in pressure of the oxygen in the latter and the air in the reservoir. Obviously, by increasing the pressure of air in the reservoir, by manipulating the bulb 23, the supply of water to the oxone is increased so that a greater supply of oxygen is created. By reason of the fact that the water is caused to recede from the oxone as soon as the escape of oxygen is stopped, the device can be set aside almost indefinitely without any oxone being wasted and the device is always ready for use, and it is merely necessary to open the oxygen discharge pipe to permit the oxygen held in the chamber 2 to pass off and thus allow water to enter the chamber for again continuing the generating process.

From the foregoing description, taken in connection with the accompanying drawing, the advantages of the construction and of the method of operation will be readily apparent to those skilled in the art to which the invention appertains, and while I have described the principle of operation of the invention, together with the apparatus which I now consider to be the best embodiment thereof, I desire to have it understood that the apparatus shown is merely illustrative, and that such changes may be made when desired as are within the scope of the claims appended hereto.

Having thus described the invention, what I claim as new, and desire to secure by Letters Patent, is:—

1. In a generating apparatus of the class described, the combination of an integral structure comprising a reservoir and a plurality of separate washers exterior to the reservoir and arranged with their bottoms in the same plane with the bottom of the reservoir, said reservoir and washers being open at the top for supplying liquid thereto, and independent closures for the reservoir and washers, said washers being smaller than the reservoir and arranged on the opposite side of the latter.

2. In a generating apparatus of the class described, the combination with a reservoir, a removable closure for the reservoir, an inverted bell integral with the said closure and having a neck rising above the closure, and a stopper in the said neck, whereby the bell carries the closure for the reservoir.

3. In a generating apparatus of the class described, the combination of an integral structure comprising a reservoir and a plurality of washers exterior to the reservoir and arranged with their bottoms in the same plane with the bottom of the reservoir, said reservoir and washers being open at the top for supplying liquid thereto, closures for the reservoir and washers, an inverted bell carried by the closure of the reservoir and formed with a neck rising above the closure, a nipple on the closure for the reservoir communicating with the space surrounding the bell, a nipple on the neck of the bell, a stopper in the said neck, a tubular connection attached to the second nipple and extending into one of the washers through the closure therefor, a tubular connection extending from one washer to the other and into the same, an outlet device connected with the last washer, an air pumping means connected with the first-mentioned nipple, and means for supporting a gas yielding substance in the bottom of the bell.

4. In an apparatus of the class described, the combination of a reservoir for containing water with an air space above the water, a bell mounted within the reservoir and spaced therefrom to provide an annular water column, a foraminous diaphragm adjustably mounted in the lower open end of the bell for permitting water to enter the latter and forming a holder for oxone, a discharge pipe through which oxygen is conducted away from the chamber, means for washing the oxygen, and a device for administering the washed oxygen to a patient.

5. In an apparatus of the class described, the combination of a reservoir for containing water with an air space above the water, a bell mounted within the reservoir and spaced therefrom to provide an annular water column, a foraminous diaphragm in the lower open end of the bell for permitting water to enter the latter under the head formed by the column and forming a holder for oxone, a discharge pipe through which oxygen is conducted away from the chamber, means for washing the oxygen, a device for administering the washed oxygen to a patient, and means for increasing the air pressure in the reservoir above the column to depress the same for accelerating the generation of oxygen by increasing the supply of water to the oxone.

6. In an apparatus of the class described, the combination of a reservoir adapted to be partially filled with liquid, a closure therefor, an oxygen generating chamber carried by the closure and supported within the reservoir and having its lower end open and submerged in the liquid, there being an annular space around the chamber partially filled with the liquid, means for supporting an oxygen-containing substance in the lower end of the chamber and permitting access of the liquid to the substance for liberating oxygen, said chamber having an opening in its top for charging the same, means for closing the opening, a device in the chamber for agitating the substance and having operating means arranged exterior to the chamber, a valve controlled discharge conduit connected with the chamber to receive oxygen therefrom, and a device for increasing the air pressure in the reservoir to supply a greater amount of liquid to the said substance for thereby accelerating the generation of oxygen.

7. In an apparatus of the class described, the combination of a reservoir adapted to be partially filled with liquid, a closure therefor, an oxygen generating chamber carried by the closure and supported within the reservoir and having its lower end open and submerged in the liquid, there being an annular space around the chamber partially filled with the liquid, means for supporting an oxygen-containing substance in the lower end of the chamber and permitting access of the liquid to the substance for liberating oxygen, said chamber having a neck in its top projecting above the closure for charging the chamber, a lateral nipple on the neck, means for closing the neck, a valve controlled discharge conduit connected with the nipple to receive oxygen therefrom, means for washing the oxygen, and a device for administering the washed oxygen to a patient.

8. In an apparatus of the class described, the combination with a reservoir adapted to be partially filled with water, an inverted bell partially submerged in the water to form an oxygen-generating chamber, a perforated diaphragm in the lower end of the bell forming a holder for oxone and permitting water to reach the same, a neck on the bell forming a charging opening, a stopper for the opening, an agitator connected with the stopper for loosening the oxone crystals from the diaphragm, and means for conducting away oxygen from the chamber.

9. In an apparatus of the class described, the combination of an air-tight reservoir partially filled with water, an inverted bell having its lower end submerged in the water, means for charging the bell with oxone, a holder for the oxone arranged in the bell to permit water to rise to and recede from the oxone as the pressure of oxygen generated by the oxone in the bell varies, a plurality of washers associated with the reservoir and independent therefrom, means for connecting the bell with one of the washers to discharge oxygen to the latter for washing the same, means for conducting the partially washed oxygen to another washer, and a device connected with the final washer for administering the oxygen to the patient.

10. In an apparatus of the class described, the combination of an air-tight reservoir partially filled with water, an inverted bell having its lower end submerged in the water, means for charging the well with oxone, a holder for the oxone arranged in the bell to permit water to rise to and recede from the oxone as the pressure of oxygen generated by the oxone in the bell varies, a plurality of washers associated with the reservoir and independent therefrom, means for connecting the bell with one of the washers to discharge oxygen to the latter for washing the same, means for conducting the partially washed oxygen to another washer, a device connected with the final washer for administering the oxygen to the patient, and a device for increasing the supply of water to the oxone for accelerating the generation of oxygen.

11. In an apparatus of the class described, the combination of an air-tight reservoir partially filled with water, an inverted bell having its lower end submerged in the water, means for charging the bell with oxone, a holder for the oxone arranged in the bell to permit water to rise to and recede from the oxone as the pressure of oxygen generated by the oxone in the bell varies, a plurality of washers associated with the reservoir and independent therefrom, means for connecting the bell with one of the washers to discharge oxygen to the latter for washing the same, means for conducting the partially washed oxygen to another washer, a device connected with the final washer for administering the oxygen to the patient, and an air pump connected with the air space of the reservoir for increasing the air pressure therein for causing a greater supply of water to the oxone to accelerate the generation of oxygen.

12. In a generating apparatus of the class described, the combination with a reservoir, an inverted bell having an integral disk-shaped flange at an intermediate point of its neck, said flange forming a closure for the reservoir, a stopper for the neck of the bell, said neck rising above the said closure, a perforated diaphragm at the open bottom of the bell, and means for adjusting the diaphragm within the bell.

In testimony, that I claim the foregoing as my own, I have hereto affixed my signature in the presence of two witnesses.

DAVID E. PARKER.

Witnesses:
HENRY J. WARDER,
JAMES H. WARDER.